United States Patent Office 3,171,865
Patented Mar. 2, 1965

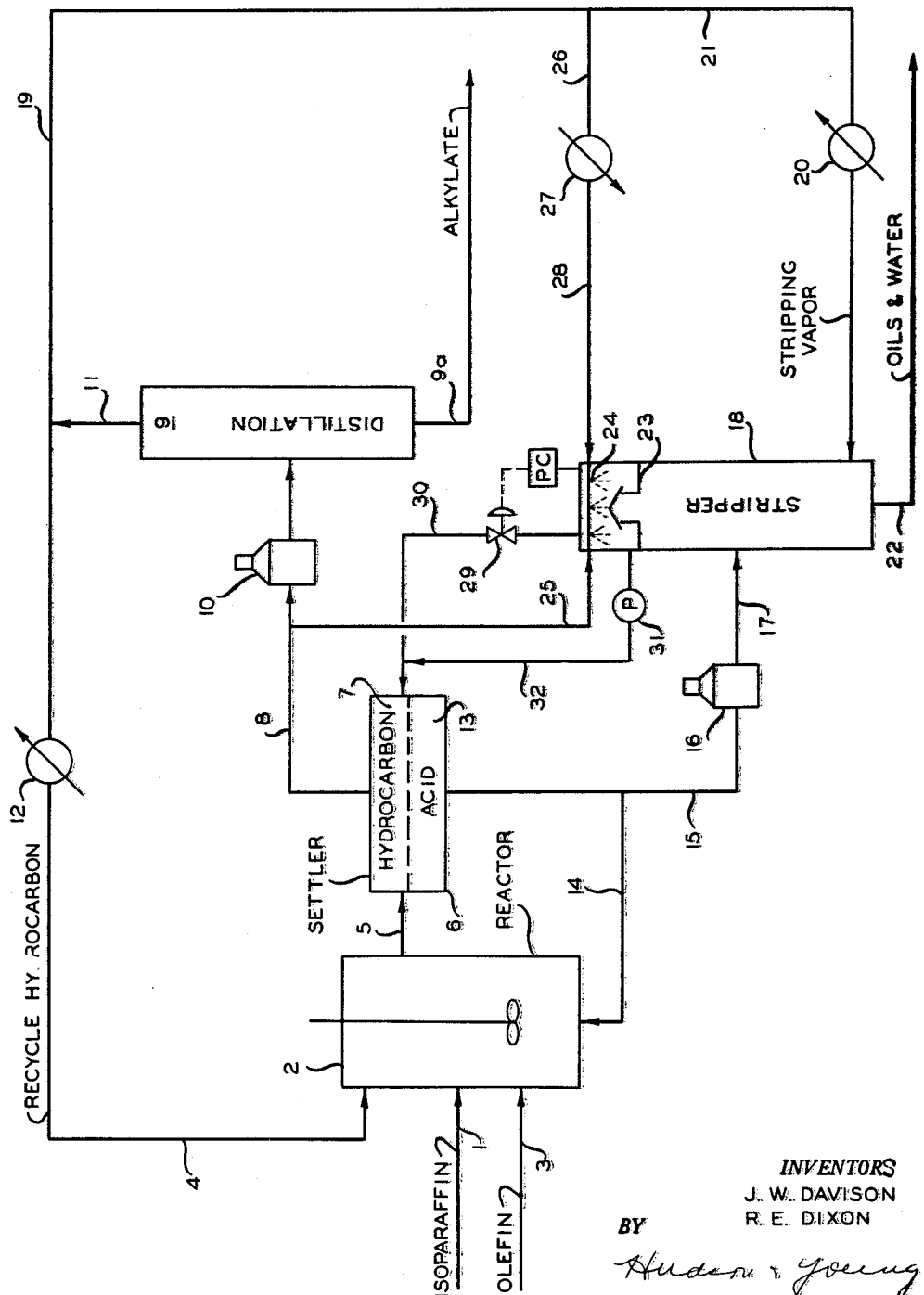

3,171,865
METHOD FOR THE PURIFICATION OF A USED LIQUID ACID ALKYLATION CATALYST
Joseph W. Davison and Rolland E. Dixon, both of Bartlesville, Okla., assignors to Phillips Petroleum Company, a corporation of Delaware
Filed Aug. 22, 1961, Ser. No. 133,155
9 Claims. (Cl. 260—683.48)

This invention relates to a method and apparatus for an improved regeneration of alkylation acid catalyst. In one of its aspects, the invention relates to a method and apparatus for rerunning of HF-acid alkylation catalyst by vaporizing said catalyst into a zone, in said zone condensing and removing oils and water present in the vaporized catalyst, substantially totally condensing vaporous catalyst in said zone, recovering totally condensed catalyst in said zone, apart from said oil and water, and returning the thus-recovered catalyst for further utilization. In a further aspect of the invention, the vaporized catalyst is passed into a combination stripping and condensing zone, a stripping section being located in a lower portion of said zone, and a condensing section being located in an upper portion of said zone, oils and water condensing in the lower portion of said zone are stripped of catalyst employing a stripping vapor and catalyst vapors passing upwardly into said condensing zone are substantially totally condensed in said condensing zone by direct contact with a condensing spray, the oils and water are removed as a bottoms product, and the condensed acid is recovered and removed from said condensing zone and returned for further utilization. Another aspect of the invention is that apparatus is provided comprising essentially a column, means in the lower portion of said column for introducing a stripping vapor, means in open communication with the lower portion of said column for withdrawing oils and water, means in a mid-portion of said column for introducing vapors of acid to be purified, means in the upper portion of said column for introducing a condensing spray, means also in the upper portion of said column for collecting condensate, and means in open communication with said means in the upper portion of said column for collecting condensate, for removing collected condensate therefrom, and returning the same for further utilization.

The alkylation of, say, an isoparaffin with an olefin or an aromatic with an olefin, or, in some cases, with an isoparaffin in the presence of some olefin are well-known processes. In these processes, there is utilized a so-called hydrogen fluoride catalyst. Also, the hydrogen fluoride catalyst is sometimes termed "hydrofluoric acid catalyst." The denomination given to the acid catalyst will depend upon the amount of water therein. Herein, and in the claims, the term "acid catalyst" or the term "hydrofluoric acid" is intended to include the variations and modifications of HF-catalyst as this is known in the alkylation art. General information on alkylation and on alkylation with HF-catalyst is plentifully available in the art and also in U.S. Patent 2,773,920, issued Dec. 11, 1956, L. H. Vautrain and Edward Strunk.

In the HF-acid alkylation process, there is a need for rerunning at least a portion of circulated HF-acid catalyst to remove therefrom any excess water and acid-soluble oils which accumulate in the operation. The acid-soluble oils are inclusive of degradation products of the hydrocarbons or other compounds being alkylated and include reaction products of the compounds being alkylated or their degradation of products with some of the acid, etc. Distillation has been the only known effective means practicable for the rerunning or purification of the acid catalyst. In the distillation, undesired materials are removed as a bottoms product while hydrogen fluoride and any stripping agent such as isobutane are removed as an overhead product. Present practice includes the use of a standard water-cooled condenser which, however, must be made of a specially alloyed material to resist the corrosion which can take place.

It has now been conceived that the condensation which heretofore has been accomplished by passing the overhead vapor through the special alloy condenser be accomplished, in situ, in the distillation zone, and that a total condensation be practiced so that there is, in effect, no overhead to be removed from the distillation zone. Thus, it has been conceived that the condensation be accomplished through a direct contact with, say, in isobutane spray in the top section of a rerun column or tower from which condensate and excess isobutane are removed and allowed to flow or pump to the alkylation unit settler or elsewhere in the unit.

An object of this invention is to provide for the purification of acid alkylation catalyst. Another object of the invention is to provide a method and means for the purification of the hydrofluoric acid catalyst used in an alkylation of hydrocarbons. Further, it is an object of the invention to provide an alkylation of a hydrocarbon with an alkylating material employing an acid catalyst which is, at least in part, periodically or continuously subjected to a regeneration and to accomplish said regeneration without the use of the usual condenser which must be of a special alloy.

Other aspects, objects and the several advantages of this invention are apparent from a study of this disclosure, the drawing and the appended claims.

According to the present invention, the acid alkylation catalyst containing catalyst-soluble oil and some water is vaporized into a distillation zone having therein, in a lower section thereof, a stripping portion and in an upper section thereof, a condensing portion, condensing oils are stripped in said lower section and removed from the operation while vapors of acid, now purified, are totally condensed in the upper section and removed therefrom and returned for further utilization. The condensation can be accomplished in a preferred embodiment by use of cold, alkylatable hydrocarbon.

The invention will now be described as it is applied to the alkylation of an isoparaffin, say, isobutane, with an olefin, say, a mixture of butylenes and propylene. It will be understood by one skilled in the art in possession of this disclosure that other alkylations known in the art and performed with acid catalyst, or a modified acid catalyst, are within the scope of this disclosure and the appended claims.

Referring now to the drawing, there is shown a considerably simplified diagrammatic flow plan of an alkylation of an isoparaffin with an olefin, as already described. Isoparaffin enters by 1 into reactor 2, to which olefin is fed by 3. Recycle hydrocarbon or isoparaffin enters 2 by way of 4. The conditions in reactor 2 are well known to one skilled in the art. Briefly, an excess of isoparaffin over olefin is employed, say, a ratio of approximately 2:1, and as high as 8:1, preferably 4:1, on an external basis is employed. The temperature in the reactor can be ambient, say, 80–100° F. A reactor effluent passes by 5 to hydrocarbon-acid settler 6 wherein a hydrocarbon phase 7 is formed and taken by 8 to fractionator 9. In distillation tower 9, unreacted or excess isoparaffin is vaporized from the remainder of the hydrocarbon phase which has been heated in heater 10 to a desired distillation temperature. Bottoms from distillation tower 9 are removed by 9a and constitute the raw alkylate. It will be understood by one skilled in the art in possession of this disclosure that, as stated, the diagram is a simple one and that there are other operations which, desirably, will be performed.

Isoparaffin vapor is taken off by 11, cooled and condensed in heat exchanger 12, and passed by 4 to reactor 2. Acid phase 13 is withdrawn by pipe 14 and passed to reactor 2. A portion of the acid phase is passed by pipe 15, heated in heater 16, and passed by 17 to rerun still or tower 18. In this embodiment, in which a stripping vapor is employed, a portion of the recycle isoparaffin is passed by 19, heater 20, and 21 into the lower section of column 18. Downwardly flowing catalyst soluble oils are stripped in the lower portion or section of tower 18 and oils and water which are undesired in the acid used as a catalyst in the operation are removed by 22. Upwardly flowing vapors pass through a liquid collecting tray 23, diagrammatically shown as a disc and doughnut-type tray and are substantially totally condensed by means of a spray 24 which, in this embodiment, is provided by cold hydrocarbon phase from settler 7 passed by 8 and 25 into the top of tower 18. If desired, an additional quantity or all of the spray can be supplied by utilizing isoparaffin from distillation tower 9 by way of 11, 19, 26, cooler 27, and 28. In the event, for some reason, the pressure should rise unduly in column 18, a pressure-controlled valve and relief pipe 29 and 30 are provided to relieve the pressure in column 18 to the hydrocarbon phase of settler 6. Purified HF-acid together with some isobutane are removed from tray 23 and sent by means of pump 31 and line 32 to settler 6.

*Example*

In an operation according to the present invention, there are introduced, from an HF-catalyzed alkylation of isobutane with a mixture of butenes and propylene, 44,000 gallons per day of used catalyst containing 4 percent catalyst soluble oil. Tower 18 is operated at a bottoms temperature of 300° F. and a tower top temperature of 140° F. There are withdrawn at 22, approximately 70 gallons per day catalyst soluble oil and 1 gallon per day water. There are recovered in tray 23 43,929 gallons per day of HF-acid, which has been purified according to the invention, together with 270,000 gallons of isobutane.

It will be apparent to one skilled in the art in possession of this disclosure and having studied the same that reasonable alternate operations can be performed in the overall alkylation operation, that the acid for rerunning or purification purposes can be taken from any suitable or desirable point and that the purified acid can be returned to any desired point in the overall operation as it may be desired to practice the same. Further, although it is now preferred to use some of a hydrocarbon phase obtained in the operation or to employ recycle isoparaffin or other alkylatable hydrocarbon, it is within the scope of the invention to utilize other means or materials for obtaining the substantially total condensation of the vapors in the upper section of column 18.

Reasonable variation and modification are possible within the scope of the foregoing disclosure, the drawing, and the appended claims to the invention, the essence of which is that used acid catalyst in an alkylation operation is vaporized in a purification or rerun zone, that purified vapors thus obtained are totally condensed with a cold hydrocarbon liquid obtained in the alkylation operation and removed from said zone together with said liquid for reuse, and that impurities left behind by the vaporized acid are removed as residue from said zone, and that apparatus for accomplishing the method of the invention has also been set forth.

We claim:
1. A method for the purification of a used liquid acid alkylation catalyst which has been separated from an alkylation effluent and which contains catalyst-soluble oil and other impurities higher boiling than said catalyst which comprises vaporizing a portion of said catalyst in a vaporizing section of a purification zone, passing vapors thus obtained to a condensing section within said zone, in said zone directly contacting said vapors with at least a portion of said alkylation effluent and therein thus condensing and collecting alkylate and purified catalyst, and removing purified liquid catalyst from said condensing section of said zone.

2. A method of rerunning used HF-acid alkylation catalyst which has become spent in an alkylation reaction in an alkylation zone, producing an alkylation effluent which comprises passing the same to the mid-section of a rerun zone, vaporizing at least a portion of said used acid in said rerun zone, passing vapors thus obtained upwardly into a total condensing section within said zone, in said condensing section totally condensing acid vapors by direct contact with a condensing liquid consisting essentially of a least a portion of said alkylation effluent, in said section, collecting condensate and said portion of effluent, withdrawing condensate from said section and said portion of effluent, and from said zone, for reuse, passing downwardly within said zone into a stripping section, unvaporized catalyst, introducing a hydrocarbon stripping vapor into the bottom of said rerun zone, and withdrawing from the bottom of said zone, catalyst-soluble oils and water which have separated from said catalyst.

3. A method according to claim 2 wherein the condensing agent is a cold hydrocarbon liquid.

4. A method according to claim 3 wherein said hydrocarbon liquid is a hydrocarbon being alkylated in the operation in which the acid is used as catalyst.

5. In a method for purification of an alkylation reaction effluent, the alkylation employing a liquid acid alkylation catalyst which is not miscible with the alkylate produced and which during the alkylation accumulates catalyst impurities which are removed which comprises performing an alkylation with said liquid catalyst in an alkylation zone, allowing the alkylation effluent reaction mass thus obtained to settle and to form two phases, a catalyst phase and an alkylate phase, separating said phases, the improvement which comprises passing at least a portion of the catalyst phase into a vaporizing zone, vaporizing said portion therein, passing vapors thus obtained upwardly into a total condensing section within said zone, in said condensing section totally condensing normally liquid catalyst vapors by a direct contact with at least a portion of said alkylate phase, withdrawing condensate and said portion of alkylate phase from said section, returning said withdrawn condensate and said portion of alkylate phase to said alkylation zone, and removing from said vaporizing zone unvaporized impurities as a residue.

6. A method according to claim 5 wherein said alkylate phase is fractionated to recover therefrom at least a portion of non-alkylated reactant and said last portion is used for said condensing by said direct contact of the normally liquid catalyst vapors.

7. A method according to claim 6 wherein the alkylation is performed with an isoparaffin and an olefin, the catalyst is liquid hydrofluoric acid and the non-alkylated reactant is said isoparaffin.

8. In a method for purification of an alkylation reaction effluent, the alkylation comprising reacting an isoparaffin with an olefin employing a liquid hydrofluoric acid alkylation catalyst which is not miscible with the alkylate produced and which during the alkylation accumulates catalyst soluble impurities which are removed which comprises performing an alkylation in an alkylation zone with said liquid catalyst, allowing the reaction mass thus obtained to settle and to form two phases, a catalyst phase and an alkylate phase, separating said phases, passing at least a portion of the catalyst phase into a vaporizing zone, vaporizing said portion therein, passing vapors thus obtained upwardly into a total condensing section within said zone, in said condensing section totally condensing normally liquid catalyst vapors by direct contact with at least a portion obtained from said alkylate phase, withdrawing condensate and said portion of alkylate phase from said section, returning said withdrawn condensate and said portion of alkylate phase to said alkylation zone, and removing from said vaporizing zone unvaporized impurities as a residue.

9. In a method for purification of an alkylation reaction effluent, the alkylation employing a liquid acid alkylation catalyst which is not miscible with the alkylate produced and which during the alkylation accumulates catalyst impurities which are removed, which comprises performing an alkylation with said liquid catalyst in an alkylation zone, allowing the alkylation effluent reaction mass thus obtained to settle in a settling zone and to form two phases, a catalyst phase and an alkylate phase, separating said phases, the improvement which comprises passing at least a portion of the catalyst phase into a vaporizing zone, vaporizing said portion therein, passing vapors thus obtained upwardly into a total condensing section within said zone, in said condensing section totally condensing normally liquid catalyst vapors by a direct contact with at least a portion of said alkylate phase, withdrawing condensate and said portion of alkylate phase from said section, returning said withdrawn condensate and said portion of alkylate phase to said settling zone, and removing from said vaporizing zone unvaporized impurities as a residue.

References Cited in the file of this patent

UNITED STATES PATENTS

| | | |
|---|---|---|
| 704,011 | Edson | July 8, 1902 |
| 1,547,893 | Bergius | July 28, 1925 |
| 2,320,629 | Matuszak | June 1, 1943 |
| 2,341,281 | McGovern | Feb. 8, 1944 |
| 2,389,971 | Frey | Nov. 27, 1945 |
| 2,408,933 | Iverson | Oct. 8, 1946 |
| 2,417,875 | Leonard | Mar. 25, 1947 |
| 2,426,559 | Matuszak | Aug. 26, 1947 |
| 2,448,092 | Gibson | Aug. 31, 1948 |
| 2,507,632 | Hickman | May 16, 1950 |
| 2,531,112 | Dauphine | Nov. 21, 1950 |
| 2,560,075 | Bloomer | July 10, 1951 |
| 2,591,010 | Rollins et al. | Apr. 1, 1952 |
| 2,774,727 | Hobson | Dec. 18, 1956 |
| 2,803,588 | Gerstner et al. | Aug. 20, 1957 |
| 2,813,134 | Johnson | Nov. 12, 1957 |
| 2,914,590 | Van Pool | Nov. 24, 1959 |